United States Patent [19]
Burrell et al.

[11] 3,753,543
[45] Aug. 21, 1973

[54] BRACKET FOR GAS CONTAINERS

[75] Inventors: Wayne R. Burrell, Golden Valley; Richard P. Burrell, Stillwater, both of Minn.

[73] Assignee: Burrell Bros., Inc., Coon Rapids, Minn.

[22] Filed: Nov. 19, 1971

[21] Appl. No.: 200,294

[52] U.S. Cl. ............................... 248/313, 211/88
[51] Int. Cl. .................................... A62c 33/00
[58] Field of Search ................ 248/313, 311, 309, 248/312, 316 R; 211/88, 89, 75, 74

[56] References Cited
UNITED STATES PATENTS

| | | | |
|---|---|---|---|
| 1,806,560 | 5/1931 | McKinley | 248/313 |
| 1,978,832 | 10/1934 | Barhoff et al. | 248/313 X |
| 2,458,329 | 1/1949 | Archer | 248/313 X |
| 1,226,968 | 5/1917 | Guenther | 248/313 X |

FOREIGN PATENTS OR APPLICATIONS

| | | | |
|---|---|---|---|
| 1,089,288 | 1/1959 | Germany | 248/313 |
| 591,557 | 8/1947 | Great Britain | 248/315 |

*Primary Examiner*—J. Franklin Foss
*Attorney*—L. Paul Burd et al.

[57] ABSTRACT

A bracket for rigidly supporting and mounting containers for compressed and liquefied gases such as refrigerant gases, fuel gases, and the like. The bracket is especially adapted for mounting spare containers of refrigerant gas for over-the-road trucks and trailers. The bracket is of simple sturdy construction permitting easy placement and removal of the gas container in the bracket. At the same time, the gas container is held securely so as to avoid vibration. The bracket is adjustable to accommodate gas containers of different sizes.

5 Claims, 4 Drawing Figures

Patented Aug. 21, 1973
3,753,543
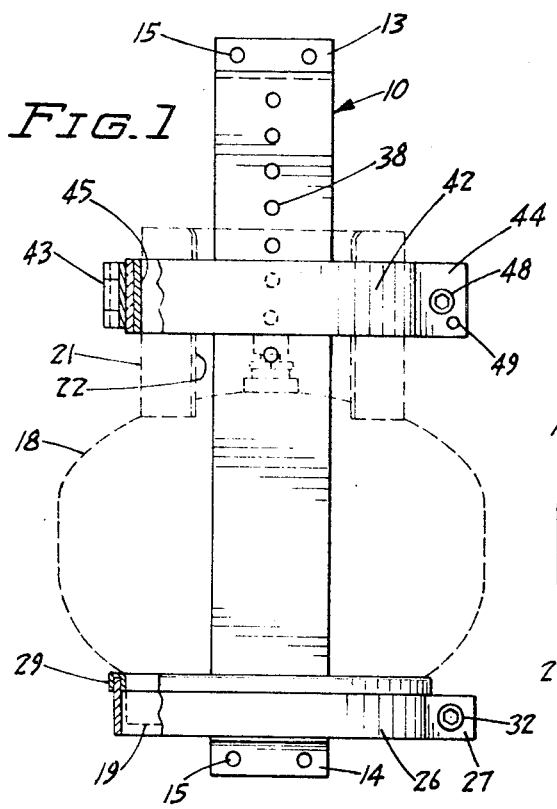
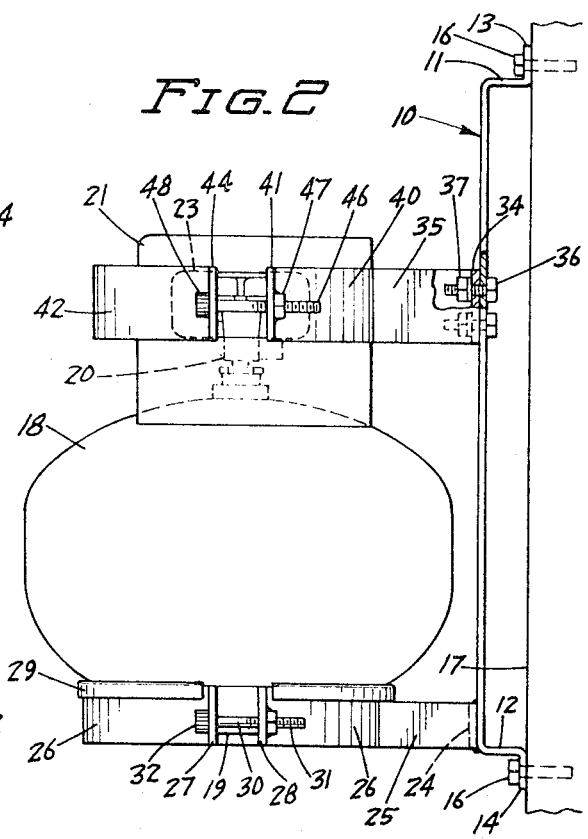
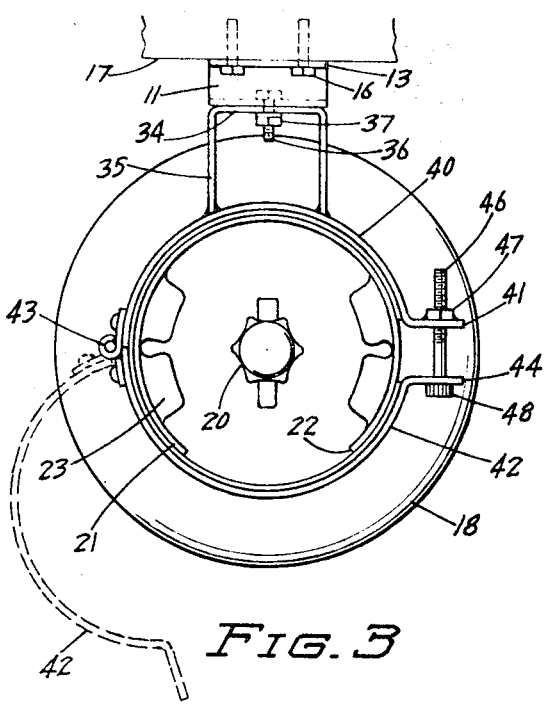
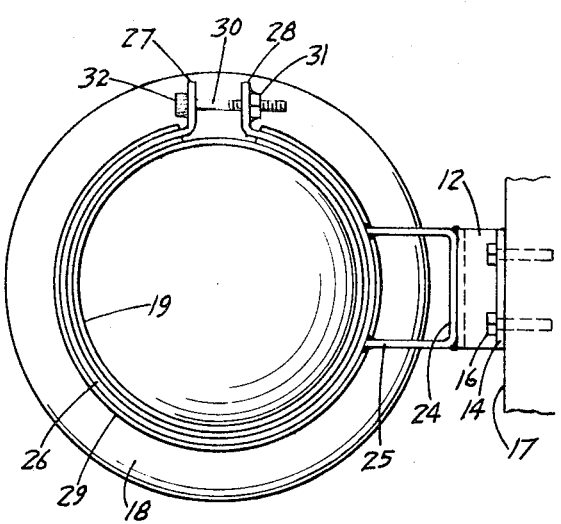
INVENTORS
WAYNE R. BURRELL
RICHARD P. BURRELL
BY Burd, Braddock & Bartz
ATTORNEYS

BRACKET FOR GAS CONTAINERS

This invention is directed to a bracket for mounting pressure containers for compressed and liquefied gases as, for example, refrigerant gases such as the fluorinated hydrocarbons sold under the brand names Freon and Daiflon; fuel gases such as propane, butane, liquefied petroleum gases, acetylene, and the like; oxygen; nitrogen; helium; etc. The bracket is especially designed for and adapted to the mounting of a spare container of refrigerant gas on over-the-road trucks and trailers, although it obviously is not so limited.

As thousands of refrigerated trucks and trailers ply the highways and byways of this country hauling perishable foods such as fresh fruits and vegetables, meats, dairy products, and the like, these trucks commonly travel great distances through widely varying climatic conditions. It often happens that a leak or other malfunction may occur, often great distances from a service center at which replacement gas can be obtained. It has not been customary in the industry to carry a spare or extra tank of refrigerant gas. Unless the malfunction can be repaired or replacement gas obtained, there is a great risk of loss of all or part of the load due to spoilage.

The bracket of the present invention facilitates the carrying of a spare container of gas. It is easily mounted on the truck, tractor or trailer. Containers may be easily placed in and removed from the bracket. While held in the bracket, the container is rigid and free from vibration. Security devices may be included to prevent theft or other unauthorized removal of the gas container.

The invention is illustrated in the accompanying drawings in which the same numerals are used to identify corresponding parts and in which:

FIG. 1 is a front elevation of a bracket according to the present invention shown with parts broken away and in section to illustrate details of construction and shown with a pressure gas container in broken lines to illustrate the manner of use of the bracket;

FIG. 2 is a side elevation showing the bracket mounted and supporting a gas container;

FIG. 3 is a top plan view of the bracket and gas container; and

FIG. 4 is a bottom plan view.

Referring now to the drawings, the bracket comprises an elongated rigid support plate, indicated generally at 10, the opposite ends 11 and 12 of which are bent inwardly at approximately right angles and then outwardly to form flanges 13 and 14, respectively, which lie in a plane spaced from but generally parallel to the main body of the support plate. Flanges 13 and 14 are provided with appropriate holes 15 to permit mounting of the bracket by means of screws or bolts 16 to a structural member 17 which may be part of a truck or tractor or trailer or building, depending upon the particular environment in which the bracket is to be used. Although the bracket is shown as being mounted vertically on a vertical structural member, this is for purposes of illustration only. The bracket may be mounted horizontally either above or below a horizontal structural member, depending upon circumstances. As shown, the plate end portions 11 and 12 hold the main body of the support plate 10 spaced from the mounting surface 17 so as to permit adjustment to accommodate gas containers of different heights.

The conventional pressurized gas container 18 is generally cylindrical or spherical with a circular flange 19 welded or otherwise secured to the bottom of the tank to function as a base. An appropriate dispensing valve 20 is fitted into the top of the gas container. To protect the valve against accidental damage, a protective collar 21 is welded or otherwise secured to the top of gas container 18 surrounding the valve but leaving an open portion 22 for access to the valve for attachment of a gas distributing line. Protective collar 21 is usually also provided with a pair of slots partially punched out and folded inwardly to form hand holds 23 to facilitate handling of the gas container.

A yoke comprising a base 24 and a pair of generally parallel spaced apart projecting arms 25 is welded or otherwise fixed to one end of support plate 10. Arms 25 in turn are welded or otherwise rigidly secured to a generally circular support ring 26 which is open on one side and is provided with a pair of outwardly projecting ears 27 and 28. Support ring 26 is of a size to receive and engage the bottom flange 19 of the gas container. The edge of support ring 26 which engages the surface of container 18 is desirably provided with a resilient cushioning channel-like cuff member 29. The ears 27 and 28 of support means 26 are secured together by means of a bolt 30 engaging a nut 31 or similar threaded member carried by one of the ears. For security reasons, the head 32 of bolt 30 is desirably an Allen head having a hexagonal recess requiring an Allen wrench for rotation. The support ring 26 may thus be tightened in order to hold the bottom of the gas container rigidly by clamping tightly around the bottom flange 19 of the gas container. Support ring 19 has sufficient resiliency to spring apart slightly to permit placement and removal of the gas container and to accommodate to any distortion of the flange 19 due to rough handling of the gas container.

A similar yoke having a base 34 and a pair of generally parallel projecting arms 35 is secured to support plate 10 spaced from support ring 26. Base 34 is preferably adjustably but rigidly secured to support plate 10 by means of bolts 36 and nuts 37, or similar fastening means, which engage holes 38 disposed longitudinally along support plate 10. Alternatively, holes 38 may be replaced by a longitudinal slot. A support collar for engaging the top protective collar 21 of the gas container is supported by arms 35. The support collar is composed of a fixed semi-circular portion 40 welded or otherwise rigidly secured to arms 35 and having an outwardly projecting ear 41, and a semi-circular movable portion 42 secured to the fixed portion 40 by means of hinge 43 and having an outwardly projecting ear 44. The support collar 40-42 is preferably provided with a resilient liner 45. Cuff 29 and liner 45 are both formed from natural and synthetic rubber or synthetic rubber-like plastic materials capable of maintaining their resilience through a wide range of temperatures and resistant to deterioration from sunlight and hydrocarbon fuels and oils, road dust, and the like, commonly encountered in travel on the highways. As in the case of support ring 26, ears 41 and 44 of the supporting collar 40-42 are secured together by means of the bolt 46 engaging a nut 47 carried by ear 41. The head 48 desirably is an Allen head requiring use of a special wrench so as to minimize likelihood of attempted theft of the gas container. Alternatively, a key locking bolt may be used or a hole 49 may by provided in each of ears 41 and 44 through which a bicycle lock or similar padlock may be inserted.

In use, the bracket is first mounted on a suitable support whether on a vehicle or a fixed structure. The top supporting collar 40–42 is secured to the support plate 10 at the appropriate height to accommodate the size of gas container to be supported in the bracket. Because the protective collar 21 at the top of the gas container is of considerable depth, some latitude is permitted in the positioning of the support collar relative to the fixed support ring 26. Support ring 26 is enlarged by spreading ears 27 and 28 apart by virtue of the inherent resilience of the ring and by rotating bolt 30. The ring is made sufficiently large that the bottom flange 19 of the gas container will fit therein easily and loosely. The support collar is opened by disengaging bolt 46 from nut 47 and separating ears 41 and 44 by swinging the movable portion 42 of the collar on hinge 43 through an arc of at least about 90° and preferably up to about 180°. In this manner, with the support collar completely open, a gas container may be easily positioned with its bottom flange 19 within bottom support ring 26 and with the top protective collar 21 engaging the inside surface of the fixed portion 40 of the support ring. Then the movable portion 42 of the support collar can be swung around into place and tightened by rotation of bolt 46 in engagement with nut 47 until the top of the container is rigidly and securely held within the support collar. The bottom support ring 26 is also tightened by rotation of bolt 30 in engagement with nut 31 so as to tighten ring 26 to firmly engage and rigidly secure the bottom flange of the gas container. Because the gas container is securely held, it is of relatively little importance whether it is mounted with its longitudinal axis vertical, horizontal or diagonal. The gas container is removed with equal ease by merely reversing the installation procedure.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A bracket for supporting containers of gas under pressure, which bracket comprises:
    A. a flat elongated longitudinally extending support plate, said support plate including:
        1. transverse flanges at opposite ends of said plate, and
        2. a plurality of equally spaced holes alinged longitudinally along said plate, said holes being engageable by fastening means,
    B. means for mounting said support plate on a structure,
    C. an open circular support ring rigidly secured to said support plate at one end thereof, said support ring having a pair of ears projecting outwardly from the free ends of the ring,
    D. fastening and adjustment means for said support ring including one member carried by one of said ears and another member engageable therewith carried by the other ear, whereby the diameter of said ring may be varied to receive and seat the bases at the bottom ends of gas containers of different sizes,
    E. a support collar detachably secured to said support plate spaced from said support ring whereby said collar is movable longitudinally relative to said support ring, and comprising a pair of semi-circular members hingedly connected at one end and each having an outwardly projecting ear at the other, said support collar including means for attachment of the support collar to the support plate, said attachment means comprising:
        1. a yoke, said yoke having
            a. a base, and
            b. a pair of arms projecting from said base and rigidly secured to one of the semi-circular members of said support collar, and
        2. at least one pair of holes in the base of said yoke, the spacing between said holes being the same as the spacing between the holes of the support plate,
    F. fastening and adjustment means for said support collar including one member carried by one of said ears and another member engageable therewith carried by the other ear, whereby the free ends of said members may be secured together and the diameter of the collar may be varied to receive and engage the upper portions of gas containers of different sizes, and
    G. a resilient liner on the inside surfaces of said support ring and support collar.

2. A bracket according to claim 1 further characterized in that said fastening and adjustment means for said support ring includes an internally threaded member carried by one of said ears and an externally threaded member engageable therewith carried by the other ear.

3. A bracket according to claim 1 further characterized in that said support ring is fixedly secured to said support plate.

4. A bracket according to claim 1 further characterized in that said fastening and adjustment means for said support collar includes an internally threaded member carried by one of said ears and an externally threaded member engageable therewith carried by the other ear.

5. A bracket according to claim 1 further characterized in that means are provided on said support collar whereby said ears may be locked together for security purposes.

* * * * *